(12) United States Patent
Liu

(10) Patent No.: US 9,883,541 B2
(45) Date of Patent: Jan. 30, 2018

(54) COMMUNICATION SWITCHING AND ESTABLISHING METHOD AND DEVICE

(71) Applicant: China Academy of Telecommunications Technology, Beijing (CN)

(72) Inventor: Jiamin Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 72 days.

(21) Appl. No.: 14/908,736

(22) PCT Filed: Aug. 28, 2014

(86) PCT No.: PCT/CN2014/085353
§ 371 (c)(1),
(2) Date: Jan. 29, 2016

(87) PCT Pub. No.: WO2015/027927
PCT Pub. Date: Mar. 5, 2015

(65) Prior Publication Data
US 2016/0192422 A1    Jun. 30, 2016

(30) Foreign Application Priority Data

Aug. 29, 2013    (CN) .......................... 2013 1 0385210

(51) Int. Cl.
*H04W 76/02*    (2009.01)
*H04W 76/04*    (2009.01)
*H04W 36/00*    (2009.01)

(52) U.S. Cl.
CPC ......... *H04W 76/023* (2013.01); *H04W 36/00* (2013.01); *H04W 76/025* (2013.01)

(58) Field of Classification Search
CPC ............. H04W 76/023; H04W 76/025; H04W 76/043; H04W 76/066; H04W 36/14; H04W 36/16
See application file for complete search history.

(56) References Cited

U.S. PATENT DOCUMENTS 9,532,360 B2 *  12/2016  Chai ................... H04W 76/023
9,572,193 B2 *   2/2017  Horneman .......... H04W 76/043
(Continued)

FOREIGN PATENT DOCUMENTS

| CN | 102783211 | 11/2012 |
| CN | 103188742 | 7/2013 |
| WO | WO-2012166969 | 12/2012 |

OTHER PUBLICATIONS

Samsung: "Solution for ProSe Service Continuity", 3GPP Draft; S2-131919-Prose-Service Continuity, 3rd Generation Partnership Project (3GPP), Mobile Competence Centre ; 650, Route Des Lucioles ; F-06921 Sophia-Antipolis Cedex ; France May 21, 2013 (May 21, 2013), XP050709093, Retrieved from the Internet: http://www.3gpp.org/ftp/tsg_sa/WG2_Arch/TSGS2_97_Busan/Docs/ [retrieved on May 21, 2013].

(Continued)

*Primary Examiner* — Ahmed Elallam
(74) *Attorney, Agent, or Firm* — Foley & Lardner LLP

(57) ABSTRACT

Disclosed are a communication switching and establishing method and device. A switching procedure comprises: an access network device determining to switch from a D2N link to a D2D link; sending a switching command to a first terminal and a second terminal; receiving a switching complete response; and saving bearer information of a bearer, which needs to be switched to the D2D link, in the D2N link, or requesting to send a bearer keep request to a core network node. A communication establishing procedure comprises: after the access network device determines that communi- (Continued)

cation needs to be established with the D2D link, determining whether a core network side link needs to be established for communication between the first terminal and the second terminal; if yes, sending a service request to a core network device, so that the core network device establishes a core network side link for the service request; and sending configuration information of the D2D link and establishment instruction information of the D2D link to the first terminal and/or the second terminal. The present application enables a first terminal and a second terminal to perform D2D communication, thereby enhancing network transmission efficiency.

18 Claims, 6 Drawing Sheets

(56) References Cited

U.S. PATENT DOCUMENTS

| | | | | |
|---|---|---|---|---|
| 9,655,165 | B2* | 5/2017 | Cho | H04W 76/043 |
| 9,674,882 | B2* | 6/2017 | Yamazaki | H04W 76/023 |
| 2010/0009675 | A1 | 1/2010 | Wijting et al. | |
| 2010/0279672 | A1* | 11/2010 | Koskela | H04W 36/30 |
| | | | | 455/418 |
| 2012/0020213 | A1* | 1/2012 | Horneman | H04W 76/043 |
| | | | | 370/231 |
| 2013/0223356 | A1* | 8/2013 | Khoshnevis | H04W 72/042 |
| | | | | 370/329 |
| 2013/0324114 | A1* | 12/2013 | Raghothaman | H04W 76/023 |
| | | | | 455/426.1 |
| 2014/0003373 | A1* | 1/2014 | Hakola | H04W 48/16 |
| | | | | 370/329 |
| 2014/0004796 | A1* | 1/2014 | Cakulev | H04W 76/023 |
| | | | | 455/41.2 |
| 2014/0044024 | A1* | 2/2014 | Zou | H04W 76/023 |
| | | | | 370/280 |
| 2014/0112194 | A1* | 4/2014 | Novlan | H04W 8/005 |
| | | | | 370/254 |
| 2014/0160950 | A1* | 6/2014 | Vasudevan | H04W 36/00 |
| | | | | 370/252 |
| 2014/0243038 | A1* | 8/2014 | Schmidt | H04W 76/023 |
| | | | | 455/552.1 |
| 2016/0029280 | A1* | 1/2016 | Qiu | H04W 36/24 |
| | | | | 370/331 |

OTHER PUBLICATIONS

ETRI: "Solution of service continuity in ProSe", 3GPP DRAFT; S2-133100 Solution for Prose Service Continuity, 3rd Generation Partnership Project (3GPP), Mobile Competence Centre ; 650, Route Des Lucioles ; F-06921 Sophia-Antipolis Cedex ; France, vol. SA WG2, no. Xiamen, China; 20130923-20130927 Sep. 17, 2013 (Sep. 17, 2013), XP050726510, Retrieved from the Internet: http://www.3gpp.org/ftp/tsg_sa/WG2_Arch/TSGS2_99_Xiamen/Docs/.

International Search Report for PCT/CN2014/085353 dated Nov. 26, 2014.

* cited by examiner

US 9,883,541 B2

COMMUNICATION SWITCHING AND ESTABLISHING METHOD AND DEVICE

This application is a US National Stage of International Application No. PCT/CN2014/085353, filed on Aug. 28, 2014, designating the United States and claiming priority to Chinese Patent Application No. 201310385210.2, filed with the State Intellectual Property Office of People's Republic of China on Aug. 29, 2013, and entitled "Method and device for switching and establishing communication", the content of which is hereby incorporated by reference in its entirety.

FIELD

The present invention relates to the field of communications and particularly to a method and device for switching and establishing communication.

BACKGROUND

In the existing communication system, a network centralized control scheme is adopted, thus transmissions of both uplink and downlink data of a User Equipment (UE, also referred to as a terminal) are controlled by the network side. Communication between two user equipments needs to be forwarded and controlled by a core network.

In the course of the evolution of the communication system, in order to better satisfy the demand of a user and to improve the efficiency of exchanging information, the mechanism of a discovery and even direct communication between the user equipments, i.e., Device to Device (D2D) communication, has been introduced.

If a demand for D2D communication between two user equipments close to each other is satisfied, then the two user equipments can conduct D2D communication with each other. There are the following two scenarios in this situation.

In a first scenario, one of the user equipments initiates a service request for the other user equipment to the network side, and the network side instructs these two user equipments to establish a D2D link, upon determining that the demand for D2D communication between the two user equipments is satisfied.

In a second scenario, the network side instructs these two user equipments to switch the communication from a Device to Network (D2N) link to a D2D link, upon determining that the demand for D2D communication between the two user equipments communicating with each other over the D2N link is satisfied.

If the two UEs in D2D communication go far away from each other due to their movements so that the demand for D2D communication is not satisfied, then the communication between these two user equipments need to be switched from the D2D link to the D2N link.

However there has been neither a particular solution to switching between the D2D link and the D2N link, nor a particular solution to establishing the D2D link.

SUMMARY

An object of the invention is to provide a method and device for switching and establishing communication so as to propose particular solutions to switching between a D2D link and a D2N link, and to establishing a D2D link.

The object of the invention is attained by the following technical solutions:

A method for switching communication includes:

determining, by an access network device, that communication between a first user equipment and a second user equipment needs to be switched from a D2N link to a D2D link;

sending, by the access network device, a switching command to the first user equipment and the second user equipment to instruct communication between the first user equipment and the second user equipment to be switched at the air interface side from the D2N link to the D2D link;

receiving, by the access network device, a response message of completed switching by the first user equipment, and a response message of completed switching by the second user equipment; and storing, by the access network device, bearer information of a bearer of the D2N link, to be switched to the D2D link, or sending a bearer maintenance request to a core network node to request the core network node for maintaining a core network side link corresponding to the bearer to be switched to the D2D link.

The embodiment of the invention provides a particular solution to switching from a D2N link to a D2D link. After switching is completed, the access network device stores the bearer information of the bearer of the D2N link, to be switched to the D2D link, or sends the bearer maintenance request to the core network node, so that switching of the D2D link to the D2N link can be performed by switching a bearer of the D2D link directly to the original bearer of the D2N link, or without newly establishing any core network side link, thereby improving the efficiency of switching.

Preferably storing, by the access network device, the bearer information of the bearer of the D2N link, to be switched to the D2D link, or sending the bearer maintenance request to the core network node to request the core network node for maintaining the core network side link corresponding to the bearer to be switched to the D2D link includes:

after switching is completed, if there are still service data being transmitted over the bearer to be switched to the D2D link, then storing, by the access network device, the bearer information of the bearer of the D2N link, to be switched to the D2D link, so that the access network device switches communication between the first user equipment and the second user equipment from the D2D link to the D2N link according to the stored bearer information;

after switching is completed, if there are no service data being transmitted over the bearer to be switched to the D2D link, then sending, by the access network device, the bearer maintenance request to the core network node to request the core network node for maintaining the core network side link corresponding to the bearer to be switched to the D2D link.

Here the bearer information of the bearer of the D2N link, to be switched to the D2D link includes:

a bearer mapping relationship between the bearer to be switched to the D2D link, and a data stream, in the D2D link, and/or General packet radio service Tunnel Protocol (GTP) information of the bearer to be switched to the D2D link.

Further to any one of the embodiments above, preferably the switching command further includes Internet Protocol (IP) 5-tuple information and/or a mapping relationship between IP 5-tuples and D2D bearers so that the first user equipment and the second user equipment switch service data satisfying the IP 5-tuple information onto the D2D link.

Further to any one of the embodiments above, preferably the switching command includes D2D link configuration information, and a D2D link establishing instruction to instruct the D2D link for communication between the first user equipment and the second user equipment to be established according to the D2D link configuration information;

the D2D link configuration information includes D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Further to any one of the embodiments above, preferably after the response message of completed switching by the first user equipment, and the response message of completed switching by the second user equipment are received, the method further includes:

for service data in the un-acknowledgment mode over the bearer of the D2N link, to be switched to the D2D link, discarding, by the access network device, the service data in the un-acknowledgment mode, or continuing with transmission of the service data in the un-acknowledgment mode over the bearer of the D2N link, to be switched to the D2D link; and for service data in the acknowledgment mode over the bearer of the D2N link, to be switched to the D2D link, continuing, by the access network device, with transmission of the service data in the acknowledgment mode over the bearer of the D2N link, to be switched to the D2D link.

Further to any one of the embodiments above, preferably after the response message of completed switching by the first user equipment, and the response message of completed switching by the second user equipment are received, the method further includes:

modifying, by the access network device. D2N link configuration information of the D2N link to thereby save a resource occupied by the D2N link; or determining, by the access network device, the bearer of the D2N link, over which no service data need to be transmitted, and removing the determined D2N link bearer over which no service data need to be transmitted.

A method for establishing communication includes:

judging, by an access network device, whether a core network side link needs to be established for communication between a first user equipment and a second user equipment upon determining that D2D link communication needs to be established between the first user equipment and the second user equipment;

if a core network side link needs to be established for communication between the first user equipment and the second user equipment, then sending, by the access network device, a service request for communication between the first user equipment and the second user equipment to a core network device so that the core network device establishes a core network side link for the service request; and sending D2D link configuration information and a D2D link establishing instruction to the first user equipment and/or the second user equipment to instruct a D2D link for communication between the first user equipment and the second user equipment to be established according to the D2D link configuration information, upon reception of an air interface link establishing instruction sent by the core network device;

if no core network side link needs to be established for communication between the first user equipment and the second user equipment, then sending, by the access network device, D2D link configuration information and a D2D link establishing instruction to the first user equipment and/or the second user equipment to instruct a D2D link for communication between the first user equipment and the second user equipment to be established according to the D2D link configuration information.

The embodiment of the invention provides a particular solution to establishing D2D communication, where the access network device judges whether a core network side link needs to be established for communication between the first user equipment and the second user equipment, upon determining that D2D link communication needs to be established between the first user equipment and the second user equipment, and sends the service request for communication between the first user equipment and the second user equipment to the core network side only if a core network side link needs to be established, thereby improving the communication efficiency and saving system resources.

Preferably after the air interface link establishing instruction sent by the core network device is received, the method further includes: storing, by the access network device, a bearer mapping relationship between D2D links and D2N links between the first user equipment and the second user equipment and/or GTP information of the bearers.

Further to any one of the embodiments above, preferably judging whether a core network side link needs to be established for communication between the first user equipment and the second user equipment includes:

judging whether switching from the D2D link to a D2N link needs to be supported, and if so, then determining that a core network side link needs to be established for communication between the first user equipment and the second user equipment; otherwise, determining that no core network side link needs to be established for communication between the first user equipment and the second user equipment.

Further to any one of the embodiments above, preferably the D2D link configuration information includes at least one of:

identifier information of the second user equipment or the first user equipment, and D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Based upon the same inventive idea as the method, an embodiment of the invention further provides an access network device including:

a switching determining module configured to determine that communication between a first user equipment and a second user equipment needs to be switched from a D2N link to a D2D link;

a switching command transmitting module configured to send a switching command to the first user equipment and the second user equipment to instruct communication between the first user equipment and the second user equipment to be switched at the air interface side from the D2N link to the D2D link;

a switching response receiving module configured to receive a response message of completed switching by the first user equipment, and a response message of completed switching by the second user equipment; and a bearer maintaining controlling module configured to store bearer information of a bearer of the D2N link, to be switched to the D2D link, or to send a bearer maintenance request to a core network node to request the core network node for maintaining a core network side link corresponding to the bearer to be switched to the D2D link.

The embodiment of the invention provides a particular solution to switching from a D2N link to a D2D link. After switching is completed, the access network device stores the bearer information of the bearer of the D2N link, to be switched to the D2D link, or sends the bearer maintenance request to the core network node, so that switching of the D2D link to the D2N link can be performed by switching a bearer of the D2D link directly to the original bearer of the D2N link, or without newly establishing any core network side link, thereby improving the efficiency of switching.

Preferably the bearer maintaining controlling module is configured:

after switching is completed, if there are still service data being transmitted over the bearer to be switched to the D2D link, to store the bearer information of the bearer of the D2N link, to be switched to the D2D link, so that the access network device switches communication between the first user equipment and the second user equipment from the D2D link to the D2N link according to the stored bearer information; and after switching is completed, if there are no service data being transmitted over the bearer to be switched to the D2D link, to send the bearer maintenance request to the core network node to request the core network node for maintaining the core network side link corresponding to the bearer to be switched to the D2D link.

Here the bearer information of the bearer of the D2N link, to be switched to the D2D link includes:

a bearer mapping relationship between the bearer to be switched to the D2D link, and a data stream, in the D2D link, and/or General packet radio service Tunnel Protocol (GTP) information of the bearer to be switched to the D2D link.

Further to any one of the embodiments of the access network device above, preferably the switching command further includes Internet Protocol (IP) 5-tuple information and/or a mapping relationship between IP 5-tuples and D2D bearers so that the first user equipment and the second user equipment switch service data satisfying the IP 5-tuple information onto the D2D link.

Further to any one of the embodiments of the access network device above, preferably the switching command includes D2D link configuration information and a D2D link establishing instruction, wherein the D2D link establishing instruction is configured to instruct the D2D link for communication between the first user equipment and the second user equipment to be established according to the D2D link configuration information;

the D2D link configuration information includes D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Further to any one of the embodiments above, preferably the access network device further includes a data processing module configured:

after the switching response receiving module receives the response message of completed switching by the first user equipment, and the response message of completed switching by the second user equipment, for service data in the un-acknowledgment mode over the bearer of the D2N link, to be switched to the D2D link, to discard the service data in the un-acknowledgment mode, or to continue with transmission of the service data in the un-acknowledgment mode over the bearer of the D2N link, to be switched to the D2D link; and for service data in the acknowledgment mode over the bearer of the D2N link, to be switched to the D2D link, to continue with transmission of the service data in the acknowledgment mode over the bearer of the D2N link, to be switched to the D2D link.

Further to any one of the embodiments above, preferably the access network device further includes a link configuring module configured:

after the switching response receiving module receives the response message of completed switching by the first user equipment, and the response message of completed switching by the second user equipment, to modify D2N link configuration information of the D2N link to thereby save a resource occupied by the D2N link; or to determine the bearer of the D2N link, over which no service data need to be transmitted, and to remove the determined D2N link bearer over which no service data need to be transmitted.

Based upon the same inventive idea as the method, an embodiment of the invention further provides an access network device including:

a link establishment judging module configured to judge whether a core network side link needs to be established for communication between a first user equipment and a second user equipment upon determining that D2D link communication needs to be established between the first user equipment and the second user equipment;

a service request transmitting module configured to send a service request for communication between the first user equipment and the second user equipment to a core network device so that the core network device establishes a core network side link for the service request, after the link establishment judging module determines that the core network side link needs to be established for communication between the first user equipment and the second user equipment;

a first air interface link establishment controlling module configured to send D2D link configuration information and a D2D link establishing instruction to the first user equipment and/or the second user equipment to instruct a D2D link for communication between the first user equipment and the second user equipment to be established according to the D2D link configuration information, upon reception of an air interface link establishing instruction sent by the core network device; and a second air interface link establishment controlling module configured to send D2D link configuration information and a D2D link establishing instruction to the first user equipment and/or the second user equipment to instruct a D2D link for communication between the first user equipment and the second user equipment to be established according to the D2D link configuration information, after the link establishment judging module determines that no core network side link needs to be established for communication between the first user equipment and the second user equipment.

The embodiment of the invention provides a particular solution to establishing D2D communication, where the access network device judges whether a core network side link needs to be established for communication between the first user equipment and the second user equipment, upon determining that D2D link communication needs to be established between the first user equipment and the second user equipment, and sends the service request for communication between the first user equipment and the second user equipment to the core network side only if a core network side link needs to be established, thereby improving the communication efficiency and saving system resources.

Preferably the access network device further includes a bearer information storing module configured to store a bearer mapping relationship between D2D links and D2N links between the first user equipment and the second user equipment and/or GTP information of the bearers after the first air interface link establishment controlling module receives the air interface link establishing instruction sent by the core network device.

Preferably the link establishment judging module is configured:

to judge whether switching from the D2D link to a D2N link needs to be supported, and if so, to determine that a core network side link needs to be established for communication between the first user equipment and the second user equipment; otherwise, to determine that no core network side link needs to be established for communication between the first user equipment and the second user equipment.

Preferably the D2D link configuration information includes at least one of:

identifier information of the second user equipment or the first user equipment, and D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Based upon the same inventive idea as the method, an embodiment of the invention further provides an access network device including a processor and a radio frequency module, wherein:

the processor is configured to determine that communication between a first user equipment and a second user equipment needs to be switched from a D2N link to a D2D link;

the radio frequency module is configured to send a switching command to the first user equipment and the second user equipment to instruct communication between the first user equipment and the second user equipment to be switched at the air interface side from the D2N link to the D2D link; and to receive a response message of completed switching by the first user equipment, and a response message of completed switching by the second user equipment; and the processor is further configured to store bearer information of a bearer of the D2N link, to be switched to the D2D link, or to send a bearer maintenance request to a core network node to request the core network node for maintaining a core network side link corresponding to the bearer to be switched to the D2D link.

Preferably the processor is configured:

after switching is completed, if there are still service data being transmitted over the bearer to be switched to the D2D link, to store the bearer information of the bearer of the D2N link, to be switched to the D2D link, so that the access network device switches communication between the first user equipment and the second user equipment from the D2D link to the D2N link according to the stored bearer information; and after switching is completed, if there are no service data being transmitted over the bearer to be switched to the D2D link, to send the bearer maintenance request to the core network node to request the core network node for maintaining the core network side link corresponding to the bearer to be switched to the D2D link.

Here the bearer information of the bearer of the D2N link, to be switched to the D2D link includes:

a bearer mapping relationship between the bearer to be switched to the D2D link, and a data stream, in the D2D link, and/or General packet radio service Tunnel Protocol (GTP) information of the bearer to be switched to the D2D link.

Further to any one of the embodiments of the access network device above, preferably the switching command further includes Internet Protocol (IP) 5-tuple information and/or a mapping relationship between IP 5-tuples and D2D bearers so that the first user equipment and the second user equipment switch service data satisfying the IP 5-tuple information onto the D2D link.

Further to any one of the embodiments of the access network device above, preferably the switching command includes D2D link configuration information and a D2D link establishing instruction, wherein the D2D link establishing instruction is configured to instruct the D2D link for communication between the first user equipment and the second user equipment to be established according to the D2D link configuration information:

the D2D link configuration information includes D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Further to any one of the embodiments above, preferably the processor is further configured:

after the radio frequency module receives the response message of completed switching by the first user equipment, and the response message of completed switching by the second user equipment, for service data in the un-acknowledgment mode over the bearer of the D2N link, to be switched to the D2D link, to discard the service data in the un-acknowledgment mode, or to continue with transmission of the service data in the un-acknowledgment mode over the bearer of the D2N link, to be switched to the D2D link; and for service data in the acknowledgment mode over the bearer of the D2N link, to be switched to the D2D link, to continue with transmission of the service data in the acknowledgment mode over the bearer of the D2N link, to be switched to the D2D link.

Further to any one of the embodiments above, preferably the processor is further configured:

after the radio frequency module receives the response message of completed switching by the first user equipment, and the response message of completed switching by the second user equipment, to modify D2N link configuration information of the D2N link to thereby save a resource occupied by the D2N link; or to determine the bearer of the D2N link, over which no service data need to be transmitted, and to remove the determined D2N link bearer over which no service data need to be transmitted.

Reference can be made to the description of the embodiments of the access network device above for particular implementations thereof, so a repeated description thereof will be omitted here.

Based upon the same inventive idea as the method, an embodiment of the invention further provides an access network device including a processor and a radio frequency module, wherein:

the processor is configured to judge whether a core network side link needs to be established for communication between a first user equipment and a second user equipment upon determining that D2D link communication needs to be established between the first user equipment and the second user equipment; and if so, to send a service request for communication between the first user equipment and the second user equipment to a core network device through the radio frequency module so that the core network device establishes a core network side link for the service request, and to send D2D link configuration information and a D2D link establishing instruction to the first user equipment and/or the second user equipment through the radio frequency module to instruct a D2D link for communication between the first user equipment and the second user equipment to be established according to the D2D link configuration information, after the radio frequency module receives an air interface link establishing instruction sent by the core network device; otherwise, to send D2D link configuration information and a D2D link establishing instruction to the first user equipment and/or the second user equipment through the radio frequency module to instruct a D2D link for communication between the first user equipment and the second user equipment to be established according to the D2D link configuration information.

Preferably the access network device further includes a memory configured to store a bearer mapping relationship between D2D links and D2N links between the first user equipment and the second user equipment and/or GTP information of the bearers after the radio frequency module receives the air interface link establishing instruction sent by the core network device.

Preferably the processor is configured:

to judge whether switching from the D2D link to a D2N link needs to be supported, and if so, to determine that a core network side link needs to be established for communication between the first user equipment and the second user equipment; otherwise, to determine that no core network side link needs to be established for communication between the first user equipment and the second user equipment.

Preferably the D2D link configuration information includes at least one of:

identifier information of the second user equipment or the first user equipment, and D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Reference can be made to the description of the embodiments of the access network device above for particular implementations thereof, so a repeated description thereof will be omitted here.

DETAILED DESCRIPTION OF THE EMBODIMENTS

The technical solutions according to the embodiments of the invention will be described below in details with reference to the drawings.

Firstly a process of establishing a D2D link, and a process of removing the link at the end of D2D communication according to the embodiments of the invention are described, and then a process of switching between the D2D link and a D2N link according to the embodiments of the invention is described.

Figure 1:
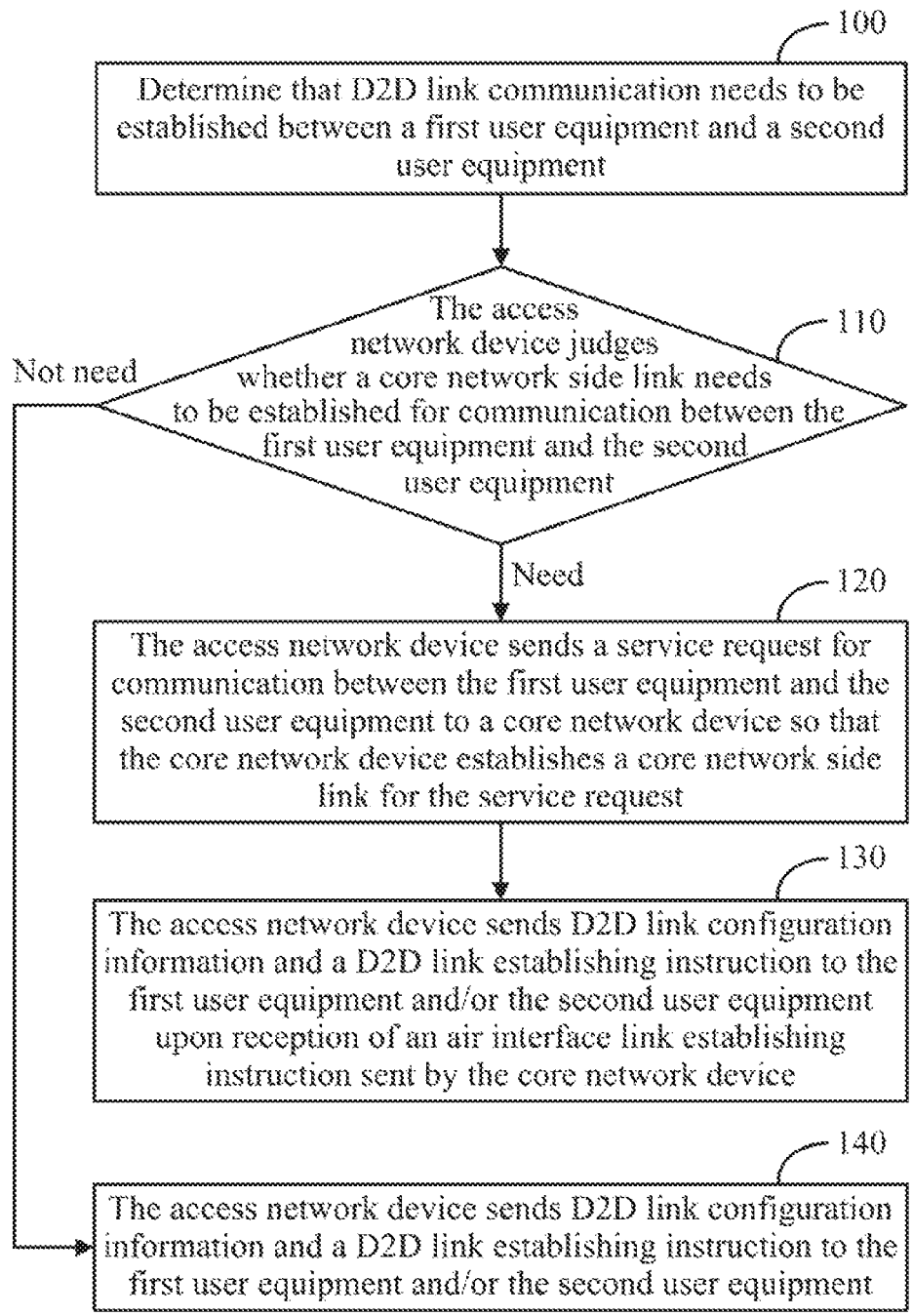
FIG. 1 is a flow chart of a first method for establishing communication according to an embodiment of the invention.

FIG. 1 illustrates a flow diagram of a method for establishing communication according to an embodiment of the invention, which depicts a process flow of an access network device in establishing D2D communication, where the method particularly includes the following operations:

In the operation 100, an access network device determines that D2D link communication needs to be established between a first user equipment and a second user equipment.

The access network device as referred to in the respective embodiments of the invention can be an evolved Node B (eNB), or can be a Node B (NB), a Home Node B (HeNB), a small eNB, etc.

In the operation 110, the access network device judges whether a core network side link needs to be established for communication between the first user equipment and the second user equipment.

If so, then the flow proceeds to the operation 120; otherwise, the flow jumps to the operation 140.

In the operation 120, the access network device sends a service request for communication between the first user equipment and the second user equipment to a core network device so that the core network device establishes a core network side link for the service request.

Here the core network device establishes the core network side link for the service request, and sends an air interface link establishing instruction to the access network device.

Particularly the core network device determines for the service request a mapping relationship between data streams and bearers, and determines a Quality of Service (QoS) requirement for each bearer. The core network device sends the QoS requirement of each bearer, and the mapping relationship between data streams and bearers to the access network device, where the core network device separates service data into at least one data stream dependent upon a data characteristic of the service data.

In an embodiment of the invention, when the first user equipment and the second user equipment transmit the service data over a D2D link, the service data are not forwarded by the network side, so the core network side link which is established above is configured to carry control signaling. For example, positional information and home information of the user equipments are detected, and if it is detected that a D2D communication condition between the first user equipment and the second user equipment is not satisfied, or that a serving cell is changed, etc., then control signaling may be issued over the established core network side link for a corresponding switching operation.

In the operation 130, the access network device sends D2D link configuration information and a D2D link establishing instruction to the first user equipment and/or the second user equipment upon reception of an air interface link establishing instruction sent by the core network device.

Here the D2D link establishing instruction is configured to instruct a D2D link for communication between the first user equipment and the second user equipment to be established according to the D2D link configuration information.

In the operation 140, the access network device sends D2D link configuration information and a D2D link establishing instruction to the first user equipment and/or the second user equipment, where the D2D link establishing instruction is configured to instruct a D2D link for communication between the first user equipment and the second user equipment to be established according to the D2D link configuration information.

In an embodiment of the invention, the D2D link configuration information and the D2D link establishing instruction can be sent in the same message (signaling), which can be an extended existing message (signaling), or which can be a newly defined message (signaling), where the embodiment of the invention will not be limited to any particular type and format of the message (signaling). The D2D link configuration information can include but will not be limited to at least one of: identifier information of the second user equipment or the first user equipment, and D2D link bearer information. If the identifier information of the user equipment is carried, then the identifier information of the second user equipment may be sent to the first user equipment, and the identifier information of the first user equipment may be sent to the second user equipment.

In an embodiment of the invention, the access network device can send the D2D link configuration information and the D2D link establishing instruction to the first user equipment and the second user equipment, where if the first user equipment or the second user equipment is not located in a coverage area thereof, then the access network device may particularly send the D2D link configuration information and the D2D link establishing instruction to the first user equipment or the second user equipment through an access network device accessed by the first user equipment or the second user equipment. The access network device can alternatively send the D2D link configuration information and the D2D link establishing instruction to only the first user equipment or the second user equipment in the coverage area thereof, and then the user equipment can send the D2D link configuration information and the D2D link establishing instruction to the opposite communication end.

The embodiments of the invention provide a particular solution to establishing D2D communication, where the access network device judges whether a core network side link needs to be established for communication between the first user equipment and the second user equipment upon determining that D2D link communication needs to be established between the first user equipment and the second user equipment, and sends the service request for communication between the first user equipment and the second user equipment to the core network side only if a core network side link needs to be established, thereby improving the communication efficiency and saving system resources.

In an embodiment of the invention, the user equipment initiating the service request may detect on its own initiative that D2D communication can be established; or the core network device may detect that D2D communication can be established between the first user equipment and the second user equipment; or the access network device may detect that D2D communication can be established between the first user equipment and the second user equipment.

In the scenario where the user equipment initiating the service request detects on its own initiative that D2D communication can be established, the user equipment initiating the service request (possibly the first user equipment or the second user equipment) ascertains that the distance between the target user equipment of the service request (if the first user equipment initiates the service request, then the second user equipment is the target user equipment; and if the second user equipment initiates the service request, then the first user equipment is the target user equipment) and the present user equipment satisfies a D2D communication condition, then sends the service request for communication between the first user equipment and the second user equipment to the access network device, where the service request carries request information for establishing D2D link communication, thus the access network device can determine hereby that the first user equipment and the second user equipment need to communicate over a D2D link.

In the scenario where the core network device detects that D2D communication can be established between the first user equipment and the second user equipment, the core network device determines from positional information, home information, etc., of the first user equipment and the second user equipment that these two user equipments are close in position to each other and can conduct D2D communication, then sends the air interface link establishing instruction to the access network device by carrying the D2D link communication instruction therein, thus the access network device can determine hereby that the first user equipment and the second user equipment need to communicate over a D2D link.

In the scenario where the access network device detects that D2D communication can be established between the first user equipment and the second user equipment, the access network device determines from positional information, home information, etc., of the first user equipment and the second user equipment that these two user equipments are close in position to each other and can conduct D2D communication, then determines that the first user equipment and the second user equipment need to communicate over a D2D link.

If the user equipment initiating the service request detects on its own initiative that D2D communication can be established, or the access network device detects that D2D communication can be established between the first user equipment and the second user equipment, then the access network device may or may not notify the core network device of a decision to establish a D2D link without bringing any subsequent operation to the core network, upon determining that the first user equipment and the second user equipment need to communicate over a D2D link.

Preferably the access network device further stores a bearer mapping relationship between D2D links and D2N links between the first user equipment and the second user equipment and/or GTP information of the bearers upon reception of the air interface link establishing instruction. Then if the access network device needs to switch from the D2D link to a D2N link, then it can switch a bearer rapidly onto the D2N link according to the stored bearer mapping relationship between D2D links and D2N links, and GTP information of the bearers.

Further to any one of the embodiments above, it can be judged whether a core network side link needs to be established for communication between the first user equipment and the second user equipment, particularly as follows: it is judged whether switching from the D2D link to a D2N link needs to be supported, and if so, then it is determined that a core network side link needs to be established for communication between the first user equipment and the second user equipment; otherwise, it is determined that no core network side link needs to be established for communication between the first user equipment and the second user equipment, where the access network device can judge whether switching from the D2D link to a D2N link needs to be supported, dependent upon types of services, speed information, user equipment preferences, network strategies, and other information, of the user equipments.

In an embodiment of the invention, a D2D link bearer can be configured in a number of ways. For example, the access network device determines a mapping relationship between data streams and D2D link bearers according to the mapping relationship between data streams and bearers, issued by the core network side.

Particularly the mapping relationship between data streams and D2D link bearers can be determined according to the mapping relationship between data streams and bearers, issued by the core network. At this time there is a one-to-one correspondence relationship between D2D link bearers and core network side link bearers.

Alternatively the mapping relationship between data streams and D2D link bearers can be determined according to the mapping relationship between data streams and bearers, issued by the core network, and a D2D bearer mapping rule. For example, if the D2D bearer mapping rule specifies that all the data streams are transmitted over one D2D bearer, then it may be determined that all the data streams correspond to the one D2D link bearer, at this time all the core network side link bearers correspond to the one D2D link bearer. If the D2D bearer mapping rule specifies that data streams with the same service characteristic are transmitted over the same D2D bearer, then it may be determined that the data streams with the same service data characteristic correspond to one D2D link bearer, and at this time, core network side link bearers corresponding to the data streams with the same service characteristic correspond to the same D2D link bearer, etc.

The access network device can determine the D2D link bearer information according to the mapping relationship between data streams and D2D link bearers, and a QoS requirement after determining the mapping relationship.

The D2D bearer mapping rule can be determined and issued by the core network device to the access network device, or can be determined by the access network device. Correspondingly the D2D link bearer information can indicate at least one D2D link bearer, where each D2D link bearer corresponds to at least one bearer of the core network side link, and the bearers of the core network side link corresponding to the respective D2D link bearers are different from each other. The D2D link bearer information can alternatively indicate D2D link bearers corresponding to different service characteristics. That is, the D2D link which is established between the first user equipment and the second user equipment can include at least one D2D link bearer, dependent on the D2D link bearer information. Particularly each D2D link bearer may correspond to a bearer of a core network side link, or a D2D link may correspond to all the bearers of core network side links through a bearer, or each bearer of a D2D link may correspond respectively to a part of bearers of core network side links, or a D2D link may include bearers corresponding to different service characteristic, for example, a D2D link may include bearers corresponding to the Acknowledgement Mode (AM) and bearers corresponding to Un-acknowledgement Mode (UM).

Furthermore the access network device can alternatively send the determined mapping relationship between data streams and D2D link bearers to the first user equipment and/or the second user equipment so that the first user equipment and/or the second user equipment determines the mapping relationship between the data stream and the switched-to D2D link bearer or D2N link bearer according to the mapping relationship in switching between the D2D link and the D2N link. The access network device can alternatively send the mapping relationship between core network side link bearers and D2D link bearers to the first user equipment and/or the second user equipment so that the first user equipment and/or the second user equipment determines the correspondence relationship between the service data transmitted over the core network link bearer, and the D2D link bearer according to the mapping relationship in switching from the D2N link to the D2D link.

Further to any one of the embodiments of the method at the access network device side above, the access network device sends an indicator of the end of D2D communication between the first user equipment and the second user equipment to the core network device upon reception of an indicator, sent by the first user equipment, of the end of D2D communication with the second user equipment, so that the core network device deletes the bearer of the core network side link corresponding to the D2D link or modifies the configuration information of the bearer of the core network side link corresponding to the D2D link; and the access network device sends a D2D link removal instruction to the first user equipment and/or the second user equipment upon reception of a bearer removal instruction sent by the core network device, so that the first user equipment and/or the second user equipment removes the D2D link.

Particularly the access network device receives the indicator, sent by the first user equipment, of the end of D2D communication with the second user equipment, through a serving base station module of the first user equipment, and sends the indicator of the end of D2D communication between the first user equipment and the second user equipment to the core network device. The core network device deletes the bearer of the respective core network side link corresponding to the D2D link (i.e., the bearer of the service corresponding to the D2D link) or modifies the configuration information of the bearer of the core network side link corresponding to the D2D link (for example, by lowering a guaranteed bit rate or notifying the user equipment of a change in size of the data stream), and sends the bearer removal instruction to the serving base station module of the first user equipment, and/or a serving base station module of the second user equipment, in the access network device. If the bearer removal instruction is received by the serving base station module of the first user equipment, then the D2D link removal instruction may be sent by the base station eNB module to the first user equipment; if the bearer removal instruction is received by the serving base station module of the second user equipment, then the D2D link removal instruction may be sent by the serving base station module to the second user equipment.

Here the D2D link removal instruction sent by the access network device can include but will not be limited to a Data Radio Bearer (DRB) Reconfiguration message, D2D link removal signaling, etc.

The particular user equipment to which the core network device sends the bearer removal instruction can be prescribed.

Figure 2:
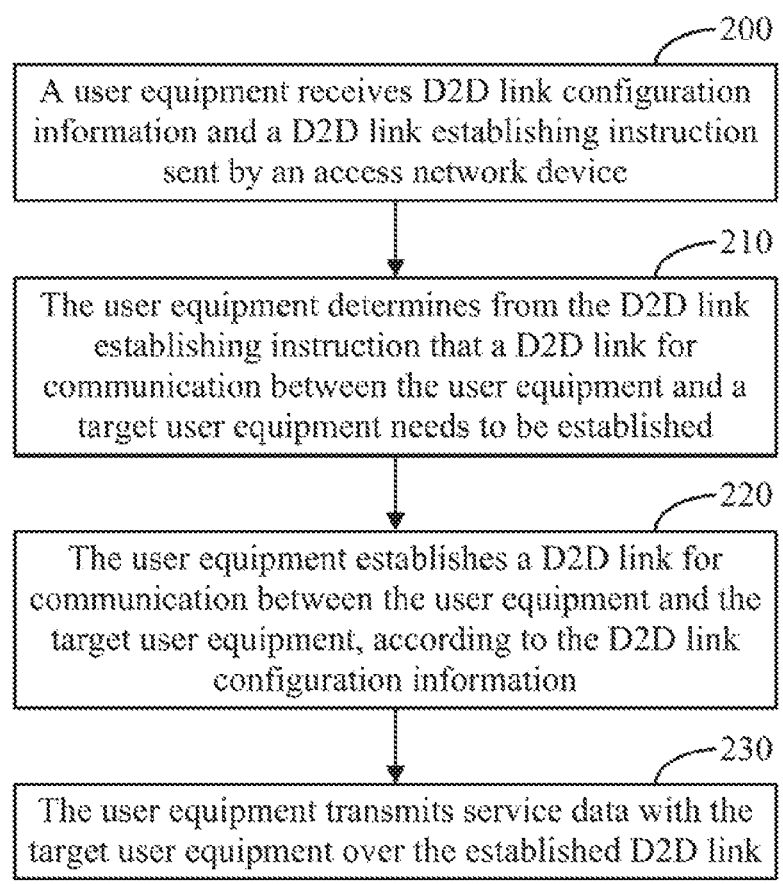
FIG. 2 is a flow chart of a second method for establishing communication according to an embodiment of the invention.

FIG. 2 illustrates a flow chart of a second method for establishing communication according to an embodiment of the invention, which depicts a process flow of a user equipment in establishing D2D communication, where the method particularly includes the following operations:

In the operation 200, a user equipment receives D2D link configuration information and a D2D link establishing instruction sent by an access network device.

In the operation 210, the user equipment determines from the D2D link establishing instruction that a D2D link for communication between the user equipment and a target user equipment needs to be established.

In the operation 220, the user equipment establishes a D2D link for communication between the user equipment and the target user equipment, according to the D2D link configuration information.

Since the D2D link is bidirectional, the user equipment particularly establishes the D2D link of the user equipment to the target user equipment according to the D2D link configuration information in the operation 220.

In the operation 230, the user equipment transfers service data with the target user equipment over the established D2D link.

Particularly the user equipment transmits service data over the D2D link, which is established by the user equipment to the target user equipment, and receives service data over the D2D link, which is established by the target user equipment to the user equipment.

Here the D2D link configuration information can include but will not be limited to at least one of:

Identifier information of the target user equipment, and D2D link bearer information.

If the user equipment initiates a service request, then the D2D link configuration information may not carry the identifier information of the target user equipment. If the target user equipment initiates a service request, then the D2D link configuration information may carry the identifier information of the target user equipment so that the D2D link to the target user equipment can be established.

Here the D2D link bearer information indicates at least one D2D link bearer, where each D2D link bearer corresponds to at least one data stream of service data, and the data streams corresponding to the respective D2D link bearers are different from each other; or the D2D link bearer information indicates D2D link bearers corresponding to different service characteristics. Reference can be made to the embodiments of the method at the access network side for a detailed description thereof, so a repeated description thereof will be omitted here. It shall be noted that static configuration of the mapping relationship between D2D links and data streams has been described here. The user equipment may not know the mapping relationship between D2D link bearers and data streams, indicated by the D2D link bearer information.

Optionally if the access network device sends the determined mapping relationship between D2D link bearers and data streams to the user equipment, then the user equipment may store the mapping relationship so that the user equipment determines the mapping relationship between the data stream and the switched-to D2D link bearer or D2N link bearer according to the mapping relationship in switching between the D2D link and the D2N link. If the access network device sends the mapping relationship between core network side link bearers and D2D link bearers to the user equipment so that the user equipment determines the correspondence relationship between the service data transmitted over the core network link bearer, and the D2D link bearer according to the mapping relationship in switching from the D2N link to the D2D link.

As prescribed, if the access network device configures D2D link bearers dependent upon different service characteristics, then the user equipment may determine the mapping of the D2D link bearer to the bearer of the core network side link dependent upon different service characteristics in the same way as the access network device after establishing the D2D link according to the D2D link configuration information.

In an embodiment of the invention, the access network device can send the D2D link configuration information and the D2D link establishing instruction to the two user equipments for D2D communication to instruct these two user equipments to establish the D2D link. Alternatively the access network device can send the D2D link configuration information to one of the user equipments for D2D communication, and the user equipment can send the D2D link configuration information to the target user equipment over the D2D link to the target user equipment after establishing the D2D link. Then further to any one of the embodiments of the method at the user equipment side above, the user equipment can further send the D2D link configuration to the target user equipment upon reception of the D2D link configuration information and the D2D link establishing instruction sent by the access network device, so that the target user equipment can establish the D2D link for communication between the user equipment and the target user equipment according to the D2D link configuration information. Particularly the D2D link configuration information is sent to the target user equipment over the established D2D link to the target user equipment. The target user equipment receiving the D2D link configuration information over the D2D link can determine that the D2D link to the user equipment needs to be established according to the D2D link configuration information. Optionally the user equipment can further send the D2D link establishing instruction to the target user equipment, and the target user equipment can determine from the D2D link establishing instruction that the D2D link to the user equipment needs to be established.

Further to any one of the embodiments of the method at the user equipment side above, if the user equipment determines the end of D2D communication, then the user equipment can send an indicator of the end of D2D communication to a core network device through the access network device, so that the core network device can delete a bearer of a core network side link corresponding to the D2D link or modify configuration information of the bearer of the core network side link corresponding to the D2D link. The user equipment removes the D2D link to the target user equipment upon reception of the D2D link removal instruction sent by the access network device, and optionally the user equipment further sends the D2D link removal instruction over the D2D link to the target user equipment before the D2D link to the target user equipment is removed, so that the target user equipment removes the D2D link to the user equipment upon reception of the D2D link removal instruction.

Figure 3:
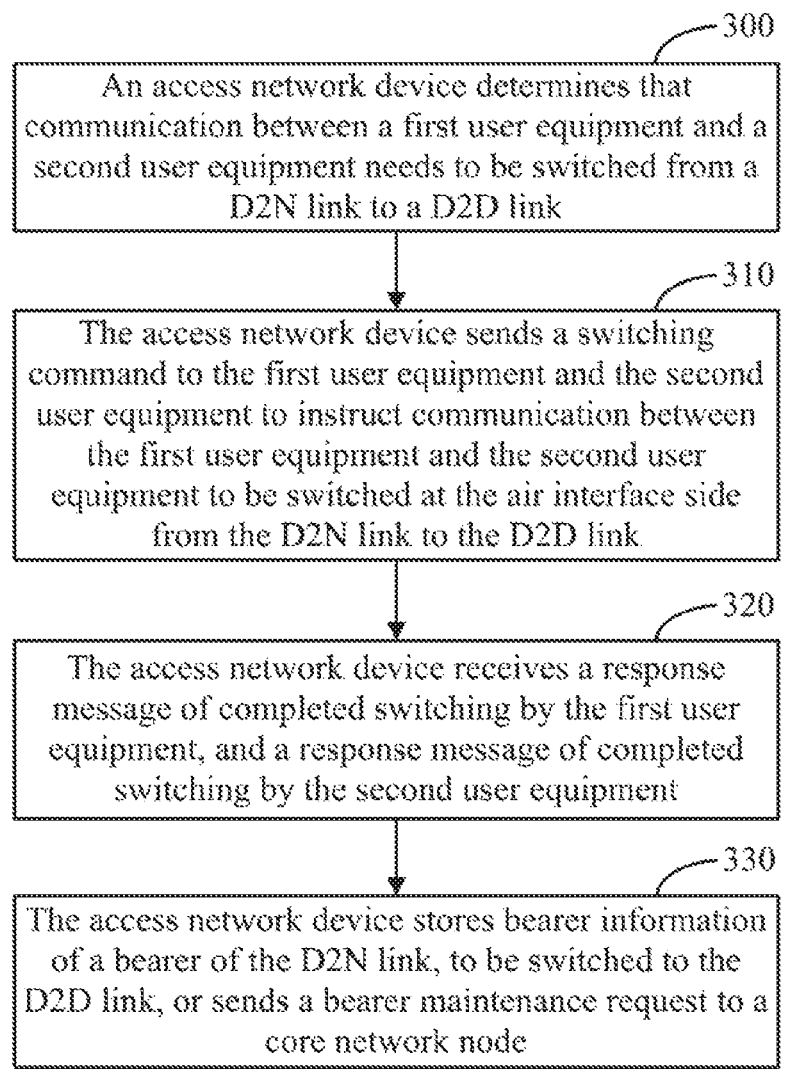
FIG. 3 is a flow chart of a first method for switching communication according to an embodiment of the invention.

FIG. 3 illustrates a flow chart of a method for switching communication according to an embodiment of the invention, which depicts a process flow of an access network device in switching from a D2N link to a D2D link, where the method particularly includes the following operations:

In the operation 300, an access network device determines that communication between a first user equipment and a second user equipment needs to be switched from a D2N link to a D2D link.

In an embodiment of the invention, the access network device can judge whether switching between D2D communication and D2N communication needs to be performed, by detecting the positions of the two user equipments, or configuring measurement between the two user equipments. Alternatively a core network device can judge whether switching between D2D communication and D2N communication needs to be performed, by detecting the positions of the two user equipments, or configuring measurement between the two user equipments, and notify the access network device upon determining that switching needs to be performed.

In the operation 310, the access network device sends a switching command to the first user equipment and the second user equipment to instruct communication between the first user equipment and the second user equipment at the air interface side to be switched from the D2N link to the D2D link.

In an embodiment of the invention, the switching command can be sent in the form of a message (signaling), which can particularly be an extended existing message (signaling), or which can be a newly defined message (signaling), where the embodiment of the invention will not be limited to any particular type and format of the message (signaling).

In the operation 320, the access network device receives a response message of completed switching by the first user equipment, and a response message of completed switching by the second user equipment.

Here if both the first user equipment and the second user equipment are located in a coverage area of the access network device, then the access network device may receive the response message of completed switching by the first user equipment, fed back by the first user equipment, and the response message of completed switching by the second user equipment, fed back by the second user equipment. If the first user equipment or the second user equipment is not located in the coverage area of the access network device, then the access network device may receive the response message of completed switching by the user equipment, fed back by the user equipment in the coverage area thereof, and the response message of completed switching by the user equipment, fed back by an access network device accessed by the user equipment which is not located in the coverage area thereof.

In the operation 330, the access network device stores bearer information of a bearer of the D2N link, to be switched to the D2D link, or sends a bearer maintenance request to a core network node to request the core network node for maintaining a core network side link corresponding to the bearer to be switched to the D2D link.

The embodiment of the invention provides a particular solution to switching from a D2N link to a D2D link. After switching is completed, the access network device stores the bearer information of the bearer of the D2N link, to be switched to the D2D link, or sends the bearer maintenance request to the core network node, so that switching of the D2D link to the D2N link can be performed by switching a bearer of the D2D link directly to the original bearer of the D2N link, or without newly establishing any core network side link, thereby improving the efficiency of switching.

Preferably the operation 330 can be performed particularly as follows: after switching is completed, if there are still service data being transmitted over the bearer to be switched to the D2D link, then the access network device may store the bearer information of the bearer of the D2N link, to be switched to the D2D link, so that the access network device switches communication between the first user equipment and the second user equipment from the D2D link to the D2N link according to the stored bearer information; and after switching is completed, if there are no service data being transmitted over the bearer to be switched to the D2D link, then the access network device may send the bearer maintenance request to the core network node to request the core network node for maintaining the core network side link corresponding to the bearer to be switched to the D2D link.

Here the bearer information of the bearer of the D2N link, to be switched to the D2D link can include but will not be limited to a bearer mapping relationship between the bearer to be switched to the D2D link, and a data stream, in the D2D link, and/or General packet radio service Tunnel Protocol (GTP) information of the bearer to be switched to the D2D link.

Further to any one of the embodiments above of switching from a D2N link to a D2D link, preferably the switching command can include but will not be limited to D2D link configuration information and a D2D link establishing instruction. The D2D link establishing instruction is configured to instruct the D2D link between the first user equipment and the second user equipment to be established according to the D2D link configuration information.

Here the D2D link configuration information includes at least D2D link bearer information. The D2D link bearer information indicates at least one D2D link bearer, where each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Reference can be made to the description of the D2D link establishing instruction and the D2D link configuration information in the process of establishing a D2D link for details thereof, so a repeated description thereof will be omitted here.

Preferably the switching command can further include Internet Protocol (IP) 5-tuple information and/or a mapping relationship between IP 5-tuples and D2D bearers so that the first user equipment and the second user equipment switch service data satisfying the IP 5-tuple information onto the D2D link.

Further to any one of the embodiments above of switching from a D2N link to a D2D link, preferably after the response message of completed switching by the first user equipment, and the response message of completed switching by the second user equipment are received, if there are still service data, which have not been transmitted, or which have been transmitted but for which acknowledged reception feedbacks have not been received, over the bearer of the D2N link, to be switched to the D2D link, then the service data can be processed as follows: if there are service data in the un-acknowledgment mode over the bearer of the D2N link, to be switched to the D2D link, then the access network device may discard the service data in the un-acknowledgment mode, or continue with transmission of the service data in the un-acknowledgment mode over the bearer of the D2N link, to be switched to the D2D link; and if there are service data in the acknowledgment mode over the bearer of the D2N link, to be switched to the D2D link, then the access network device may continue with transmission of the service data in the acknowledgment mode over the bearer of the D2N link, to be switched to the D2D link.

After the response message of completed switching by the first user equipment, and the response message of completed switching by the second user equipment are received, if there are still service data, which have not been transmitted, or which have been transmitted but for which acknowledged reception feedbacks have not been received, over the bearer of the D2N link, to be switched to the D2D link, then moreover the transmission of the data, and the acknowledgement feedbacks, over the bearer of the D2N link, to be switched to the D2D link can be accelerated in some way. For example, service data of the first user equipment and the second user equipment, transmitted over the bearer of the D2N link, to be switched to the D2D link can be scheduled preferentially, or a poll bit can be carried to require the user equipment receiving the service data in the acknowledgment mode to make a rapid feedback.

Further to any one of the embodiments above of switching from a D2N link to a D2D link, preferably after the response message of completed switching by the first user equipment, and the response message of completed switching by the second user equipment are received, the access network device can modify the D2N link configuration information of the D2N link to thereby save a resource occupied by the D2N link, particularly by lowering a Guaranteed Bit Rate (GBR). After the response message of completed switching by the first user equipment, and the response message of completed switching by the second user equipment are received, the access network device determines the D2N link bearer of the D2N link, over which no service data need to be transmitted, and removes the determined D2N link bearer over which no service data need to be transmitted.

Further to any one of the embodiments above of switching from a D2N link to a D2D link, preferably the eNB can further determine that service data between the first user equipment and the second user equipment need to be switched onto the D2D link, according to address information of these two user equipments. Furthermore the eNB can further determine that service data of a specified type between the first user equipment and the second user equipment need to be switched onto the D2D link, according to types of the service data transmitted between these two user equipments.

Furthermore the access network device can send to the first user equipment and/or the second user equipment at least one of: a specified type of service data to be switched onto the D2D link; an IP 5-tuple of the service data to be switched; an IP address of the service data to be switched; the mapping relationship between data streams and D2D link bearers; and the mapping relationship between core network side link bearers and D2D link bearers.

In an embodiment of the invention, if the access network device determines that communication between the first user equipment and the second user equipment needs to be switched from the D2D link to the D2N link, then the communication can be switched to the already established D2N link, or a newly established D2N link to thereby complete switching.

If the access network device determines that communication between the first user equipment and the second user equipment needs to be switched from the D2D link to the already established D2N link, then the access network device may perform switching according to the stored bearer information. Alternatively the access network device can modify the D2N link configuration information of the already established D2N link, so that the already established D2N link can accommodate the service data switched to the already established D2N link, that is, the resource occupied by the already established D2N link can be improved to thereby accommodate the service data switched to the already established D2N link, particularly by improving a Guaranteed Bit Rate (GBR) of the D2N link.

If the D2N link is newly established, then the access network device can further transmit the D2N link configuration information to the first user equipment and the second user equipment upon determining that communication between the first user equipment and the second user equipment needs to be switched from the D2D link to the D2N link, so that the first user equipment and the second user equipment establish the D2N link respectively according to the D2N link configuration information, and switch communication between the first user equipment and the second user equipment from the D2D link to the newly established D2N link, where the D2N link configuration information can be sent together with the switching command, for example, in the same message (signaling).

In an embodiment of the invention, if communication between the first user equipment and the second user equipment is switched from the D2D link to the newly established D2N link, then the core network device can issue a QoS requirement of each bearer, and a mapping relationship between data streams and bearers. The access network device configures the D2N link configuration information according to the QoS requirement, and the mapping relationship between data streams and bearers. Alternatively, the access network device can configure the D2N link configuration information according to a QoS requirement, and a mapping relationship between data streams and bearers, which are received upon a service request.

Further to any one of the embodiments above of switching from a D2D link to a D2N link, the access network device further receives switching completion responses fed back by the first user equipment and the second user equipment, through serving base station modules of the first user equipment and the second user equipment, and forwards service data transmitted between the first user equipment and the second user equipment, through the D2N link upon reception of the switching completion responses.

Figure 4:
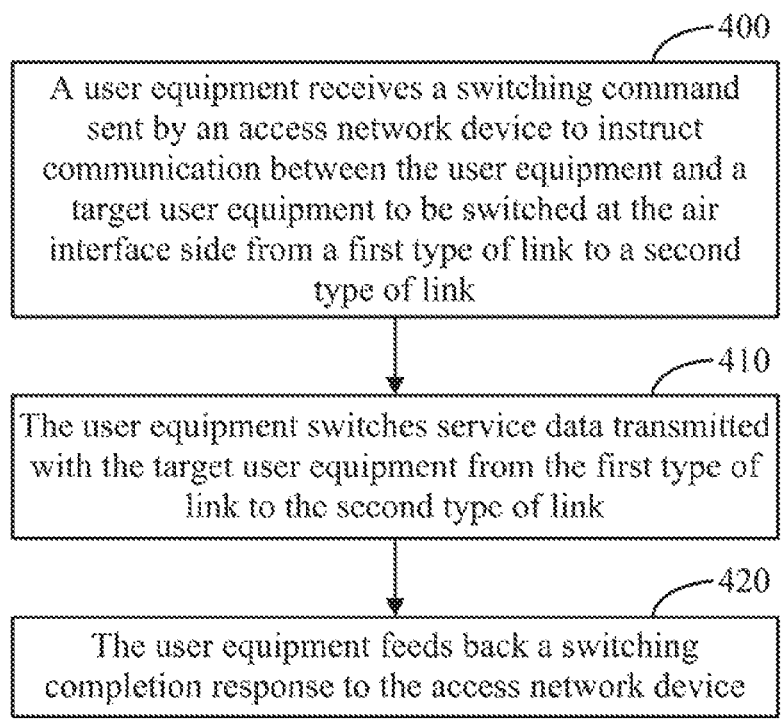
FIG. 4 is a flow chart of a second method for switching communication according to an embodiment of the invention.

FIG. 4 illustrates a flow chart of a second method for switching communication according to an embodiment of the invention, which depicts a process flow of a user equipment in switching between D2D communication and D2N communication, where the method particularly includes the following operations:

In the operation 400, a user equipment receives a switching command sent by an access network device to instruct communication between the user equipment and a target user equipment to be switched at the air interface side from a first type of link to a second type of link.

In the operation 410, the user equipment switches service data transmitted with the target user equipment from the first type of link to the second type of link.

Here the first type of link is a D2D link, and the second type of link is a D2N link. Alternatively the first type of link is a D2N link, and the second type of link is a D2D link.

In the operation 420, the user equipment feeds back a switching completion response to the access network device.

If the switching command instructs the communication to be switched from the D2D link to the D2N link, then the user equipment may further receive D2N link configuration information sent by the access network device, ascertain from the received D2N link configuration information that a D2N link needs to be newly established, and switch the communication with the target user equipment from the D2D link to the newly established D2N link. Alternatively the user equipment may determine from an instruction of the switching command that a D2N link needs to be newly established, and switch the communication with the target user equipment from the D2D link to the newly established D2N link. Alternatively if the switching command does not instruct the communication to be switched to the already established D2N link, then the user equipment may determine that a D2N link needs to be newly established, and switch the communication with the target user equipment from the D2D link to the newly established D2N link. Correspondingly the operation 410 can be performed particularly as follows: the user equipment establishes the D2N link according to the D2N link configuration information, switches service data with the target user equipment, transmitted over the D2D link onto the D2N link for transmission according to a mapping relationship between data streams and D2N link bearers, and removes the D2D link.

In an embodiment of the invention, the user equipment can ascertain the mapping relationship between data streams and D2N link bearers in a prescribed manner; or can retrieve the mapping relationship between data streams and D2N link bearers from the network side; or can retrieve a mapping relationship between core network link bearers and D2N link bearers from the network side, and determine the mapping relationship between data streams and D2N link bearers according to the mapping relationship.

Here a data stream refers to a set of service data.

If the switching command instructs the communication to be switched from the D2D link to the D2N link, and particularly instructs the communication between the user equipment and the target user equipment to be switched to the already established D2N link, for transmission of service data, then the user equipment can modify a configuration parameter of the already established D2N link, according to the D2N link configuration information sent by the access network device, so that the already established D2N link can accommodate the service data switched to the already established D2N link.

If the switching command instructs the communication from the D2D link to the D2N link, and particularly instructs the communication between the user equipment and the target user equipment to be switched to the already established D2N link, for transmission of service data, then the operation 410 can be performed particularly as follows: the user equipment switches the service data with the target user equipment, transmitted over the D2D link onto the already established D2N link according to a mapping relationship between data streams and bearers of the already established D2N link; and removes the D2D link.

Further to any one of the embodiments above of switching from the D2D link to the D2N link, preferably the user equipment can feed back the switching completion response to the access network device as follows: the user equipment judges whether there are service data, which have been transmitted, but for which acknowledged reception feedbacks have not been received, over the D2D link; and if so, then the user equipment may continue with transmission of the service data, which have been transmitted, but for which acknowledged reception feedbacks have not been received, over the D2D link; otherwise, the user equipment may feed back the switching completion response to the access network device.

Further to any one of the embodiments above of switching from the D2D link to the D2N link, preferably after the user equipment feeds back the switching completion response to the access network device, if there are service data, which have not been transmitted, over the D2D link, then the user equipment can further transmit the service data, which have not been transmitted, over the D2N link.

If the switching command instructs the communication to be switched from the D2N link to the D2D link, then the switching command can include but will not be limited to D2D link configuration information and a D2D link establishing instruction. The operation 410 can be performed particularly as follows: the user equipment determines from the D2D link establishing instruction that the D2D link for communication between the user equipment and the target user equipment needs to be established, and establishes the D2D link for communication between the user equipment and the target user equipment according to the D2D link configuration information; and the user equipment transmits service data with the target user equipment over the established D2D link, starting from a predetermined instance of time.

Here the D2D link configuration information includes D2D link bearer information. The D2D link bearer information indicates at least one D2D link bearer, where each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics. Reference can be made to the embodiment of the process flow of establishing D2D communication for a detailed description thereof, so a repeated description thereof will be omitted here.

Further to any one of the embodiments above of switching from the D2N link to the D2D link, preferably if the user equipment further receives D2N link configuration information sent by the access network device, then the user equipment can modify a configuration parameter of the D2N link according to the D2N link configuration information sent by the access network device to thereby save a resource occupied by the D2N link. If the user equipment further receives an instruction sent by the access network device to remove the D2N link, then the user equipment may remove the D2N link or a part of bearers thereof according to the instruction.

Further to any one of the embodiments above of switching from the D2N link to the D2D link, preferably if there are still service data being transmitted with the target user equipment over the D2N link, then the user equipment may receive the service data from the target user equipment over the D2N link, and receive the service data from the target user equipment over the established D2D link when transferring service data with the target user equipment over the D2D link. Correspondingly the user equipment firstly processes the service data from the target user equipment, received over the D2N link.

Particularly the user equipment can firstly process the service data from the target user equipment, received over the D2N link as follows: the user equipment starts a timer upon reception of the service data from the target user equipment over the D2N link, and processes the service data from the target user equipment, received over the D2N link; and if the user equipment receives again the service data from the target user equipment over the D2N link before the timer expires, then the user equipment may restart the timer, and process the service data from the target user equipment, received again over the D2N link; and if the timer expires, then the user equipment may process the service data from the target user equipment, received over the D2D link. Alternatively the user equipment can firstly process the service data from the target user equipment, received over the D2N link as follows: the access network device carries timer length of time information in the switching command, and the user equipment starts a timer according to the length of time information upon reception of the switching command. The user equipment firstly processes the service data from the target user equipment, received over the D2N link while the timer is counting, and then starts to process the service data from the target user equipment, received over the D2D link after the timer expires. Still alternatively the user equipment can firstly process the service data from the target user equipment, received over the D2N link as follows: the user equipment starts a timer according to a preset counting length of time. The user equipment firstly processes the service data from the target user equipment, received over the D2N link while the timer is counting, and then starts to process the service data from the target user equipment, received over the D2D link after the timer expires.

Further to any one of the embodiments above of switching from the D2N link to the D2D link, communication with the target user equipment can be switched to the D2D link particularly by switching the service data transmitted over the D2N link onto the D2D link according to a mapping relationship between data streams and D2N link bearers, where if at least one of a specified type of service data to be switched onto the D2D link, an IP 5-tuple of the service data to be switched, and an IP address of the service data to be switched is received, then the data to be switched onto the D2D link may be determined from an indicator of the information.

If a mapping relationship between data streams and D2D link bearers is received, then respective data streams of service data may be switched onto corresponding D2D link bearers according to the mapping relationship.

If a mapping relationship between core network side link bearers and D2D link bearers is received, then a mapping relationship between data streams and D2D link bearers may be determined according to the mapping relationship, and respective data streams of service data may be switched onto corresponding D2D link bearers according to the mapping relationship between data streams and D2D link bearers.

The user equipment can alternatively determine a mapping relationship between data streams and D2D link bearers according to a predetermined rule. For example, transmission data in the acknowledgment mode are switched to D2D link bearer in the acknowledgment mode, and transmission data in the un-acknowledgment mode are switched to D2D link bearer in the un-acknowledgment mode.

Particularly if the switching command further includes IP 5-tuple information and/or a mapping relationship between IP 5-tuples and D2D bearers, then the user equipment may switch service data satisfying the IP 5-tuple information onto the D2D link.

For example, there are three bearers in the D2N link of the user equipment to carry a video telephone service and another service, where the video telephone service is a service between the user equipment and the target user equipment, and the other service is a service directed to a network server. Data streams are mapped per QoS so that data streams of the video telephone service are mapped onto all the three bearers. The video telephone service needs to be switched onto the D2D link. Firstly bearers can be established over the D2D link, where there may be three bearers according to the mapping relationship between data streams and D2D bearers so that these bearers correspond respectively to the three bearers of the D2N link, corresponding to the video telephone service, or there may be one bearer so that all the data are transmitted together through a large pipeline, or there may be two bearers so that D2D links with corresponding characteristics are merged for the two bearers; and attribute information of IP streams corresponding to the video telephone service, and a mapping relationship between the attribute information and the D2D bearers may be configured, where the configuration may be made by the core network node, or sent by the core network node to the access network node which further forwards the configuration to the user equipment.

Correspondingly if the switching command carries IP 5-tuple information, then the user equipment may switch service data of the respective D2N bearers satisfying the IP 5-tuple information onto the corresponding D2D link, according to the IP 5-tuple information and a mapping relationship between D2N bearers and D2D bearers. If the switching command carries a mapping relationship between IP 5-tuples and D2D bearers, then the user equipment may switch service data satisfying the IP 5-tuples onto the corresponding D2D links according to the mapping relationship.

Figure 5:
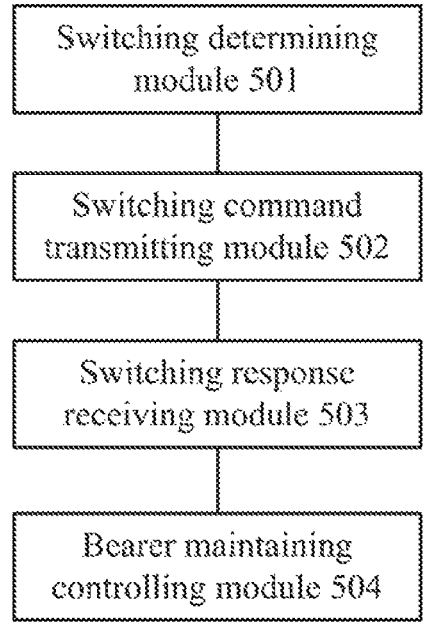
FIG.5 is a schematic diagram of a first access network device according to an embodiment of the invention.

Based upon the same inventive idea as the method, an embodiment of the invention further provides an access network device, as illustrated in FIG. 5, which includes:

A switching determining module 501 is configured to determine that communication between a first user equipment and a second user equipment needs to be switched from a D2N link to a D2D link;

A switching command transmitting module 502 is configured to send a switching command to the first user equipment and the second user equipment to instruct communication between the first user equipment and the second user equipment to be switched at the air interface side from the D2N link to the D2D link;

A switching response receiving module 503 is configured to receive a response message of completed switching by the first user equipment, and a response message of completed switching by the second user equipment; and A bearer maintaining controlling module 504 is configured to store bearer information of a bearer of the D2N link, to be switched to the D2D link, or to send a bearer maintenance request to a core network node to request the core network node for maintaining a core network side link corresponding to the bearer to be switched to the D2D link.

The embodiment of the invention provides a particular solution to switching from a D2N link to a D2D link. After switching is completed, the access network device stores the bearer information of the bearer of the D2N link, to be switched to the D2D link, or sends the bearer maintenance request to the core network node, so that switching of the D2D link to the D2N link can be performed by switching a bearer of the D2D link directly to the original bearer of the D2N link, or without newly establishing any core network side link, thereby improving the efficiency of switching.

Preferably the bearer maintaining controlling module 504 is configured:

After switching is completed, if there are still service data being transmitted over the bearer to be switched to the D2D link, to store the bearer information of the bearer of the D2N link, to be switched to the D2D link, so that the access network device switches communication between the first user equipment and the second user equipment from the D2D link to the D2N link according to the stored bearer information; and After switching is completed, if there are no service data being transmitted over the bearer to be switched to the D2D link, to send the bearer maintenance request to the core network node to request the core network node for maintaining the core network side link corresponding to the bearer to be switched to the D2D link.

Here the bearer information of the bearer of the D2N link, to be switched to the D2D link includes:

A bearer mapping relationship between the bearer to be switched to the D2D link, and a data stream, in the D2D link, and/or General packet radio service Tunnel Protocol (GTP) information of the bearer to be switched to the D2D link.

Further to any one of the embodiments of the access network device above, preferably the switching command further includes Internet Protocol (IP) 5-tuple information and/or a mapping relationship between IP 5-tuples and D2D bearers so that the first user equipment and the second user equipment switch service data satisfying the IP 5-tuple information onto the D2D link.

Further to any one of the embodiments of the access network device above, preferably the switching command includes D2D link configuration information, and a D2D link establishing instruction to instruct the D2D link for communication between the first user equipment and the second user equipment to be established according to the D2D link configuration information;

The D2D link configuration information includes D2D link bearer information; and The D2D link bearer information indicates at least one D2D link bearer, where each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Further to any one of the embodiments above, preferably the access network device further includes a data processing module configured:

After the switching response receiving module 503 receives the response message of completed switching by the first user equipment, and the response message of completed switching by the second user equipment, for service data in the un-acknowledgment mode over the bearer of the D2N link, to be switched to the D2D link, to discard the service data in the un-acknowledgment mode, or to continue with transmission of the service data in the un-acknowledgment mode over the bearer of the D2N link, to be switched to the D2D link; and for service data in the acknowledgment mode over the bearer of the D2N link, to be switched to the D2D link, to continue with transmission of the service data in the acknowledgment mode over the bearer of the D2N link, to be switched to the D2D link.

Further to any one of the embodiments above, preferably the access network device further includes a link configuring module configured:

After the switching response receiving module 503 receives the response message of completed switching by the first user equipment, and the response message of completed switching by the second user equipment, to modify the D2N link configuration information of the D2N link to thereby save a resource occupied by the D2N link; or to determine the bearer of the D2N link, over which no service data need to be transmitted, and to remove the determined D2N link bearer over which no service data need to be transmitted.

Figure 6:
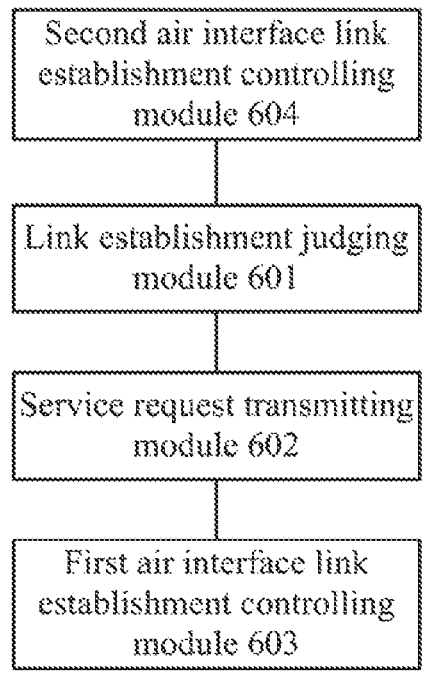
FIG.6 is a schematic diagram of a second access network device according to an embodiment of the invention.
Figure 7:
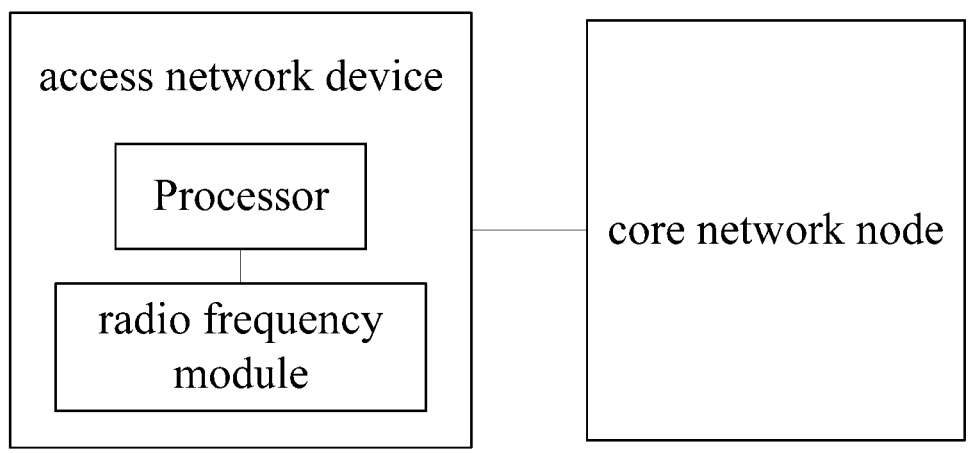
FIG.7 is a schematic diagram of an access network device and a core network node according to an embodiment of the invention.

Based upon the same inventive idea as the method, an embodiment of the invention further provides another access network device, as illustrated in FIG. 6, including:

A link establishment judging module 601 is configured to judge whether a core network side link needs to be established for communication between a first user equipment and a second user equipment upon determining that D2D link communication needs to be established between the first user equipment and the second user equipment;

A service request transmitting module 602 is configured to send a service request for communication between the first user equipment and the second user equipment to a core network device so that the core network device establishes a core network side link for the service request, after the link establishment judging module 601 determines that the core network side link needs to be established for communication between the first user equipment and the second user equipment;

A first air interface link establishment controlling module 603 is configured to send D2D link configuration information and a D2D link establishing instruction to the first user equipment and/or the second user equipment to instruct a D2D link for communication between the first user equipment and the second user equipment to be established according to the D2D link configuration information, upon reception of an air interface link establishing instruction sent by the core network device; and A second air interface link establishment controlling module 604 is configured to send D2D link configuration information and a D2D link establishing instruction to the first user equipment and/or the second user equipment to instruct a D2D link for communication between the first user equipment and the second user equipment to be established according to the D2D link configuration information, after the link establishment judging module 601 determines that no core network side link needs to be established for communication between the first user equipment and the second user equipment.

The embodiment of the invention provides a particular solution to establishing D2D communication, where the access network device judges whether a core network side link needs to be established for communication between the first user equipment and the second user equipment, upon determining that D2D link communication needs to be established between the first user equipment and the second user equipment, and sends the service request for communication between the first user equipment and the second user equipment to the core network side only if a core network side link needs to be established, thereby improving the communication efficiency and saving system resources.

Preferably the access network device further includes a bearer information storing module configured to store a bearer mapping relationship between D2D links and D2N links between the first user equipment and the second user equipment and/or GTP information of the bearers after the first air interface link establishment controlling module 603 receives the air interface link establishing instruction sent by the core network device.

Preferably the link establishment judging module 601 is configured:

To judge whether switching from the D2D link to a D2N link needs to be supported, and if so, to determine that a core network side link needs to be established for communication between the first user equipment and the second user equipment; otherwise, to determine that no core network side link needs to be established for communication between the first user equipment and the second user equipment.

Preferably the D2D link configuration information includes at least one of:

Identifier information of the second user equipment or the first user equipment, and D2D link bearer information; and The D2D link bearer information indicates at least one D2D link bearer, where each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Based upon the same inventive idea as the method, an embodiment of the invention further provides an access network device including a processor and a radio frequency module, where:

The processor is configured to determine that communication between a first user equipment and a second user equipment needs to be switched from a D2N link to a D2D link;

The radio frequency module is configured to send a switching command to the first user equipment and the second user equipment to instruct communication between the first user equipment and the second user equipment to be switched at the air interface side from the D2N link to the D2D link; and to receive a response message of completed switching by the first user equipment, and a response message of completed switching by the second user equipment; and The processor is further configured to store bearer information of a bearer of the D2N link, to be switched to the D2D link, or to send a bearer maintenance request to a core network node to request the core network node for maintaining a core network side link corresponding to the bearer to be switched to the D2D link.

Preferably the processor is configured:

After switching is completed, if there are still service data being transmitted over the bearer to be switched to the D2D link, to store the bearer information of the bearer of the D2N link, to be switched to the D2D link, so that the access network device switches communication between the first user equipment and the second user equipment from the D2D link to the D2N link according to the stored bearer information; and After switching is completed, if there are no service data being transmitted over the bearer to be switched to the D2D link, to send the bearer maintenance request to the core network node to request the core network node for maintaining the core network side link corresponding to the bearer to be switched to the D2D link.

Here the bearer information of the bearer of the D2N link, to be switched to the D2D link includes:

A bearer mapping relationship between the bearer to be switched to the D2D link, and a data stream, in the D2D link, and/or General packet radio service Tunnel Protocol (GTP) information of the bearer to be switched to the D2D link.

Further to any one of the embodiments of the access network device above, preferably the switching command further includes Internet Protocol (IP) 5-tuple information and/or a mapping relationship between IP 5-tuples and D2D bearers so that the first user equipment and the second user equipment switch service data satisfying the IP 5-tuple information onto the D2D link.

Further to any one of the embodiments of the access network device above, preferably the switching command includes D2D link configuration information, and a D2D link establishing instruction to instruct the D2D link for communication between the first user equipment and the second user equipment to be established according to the D2D link configuration information:

The D2D link configuration information includes D2D link bearer information; and The D2D link bearer information indicates at least one D2D link bearer, where each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Further to any one of the embodiments above, preferably the processor is further configured:

After the radio frequency module receives the response message of completed switching by the first user equipment, and the response message of completed switching by the second user equipment, for service data in the un-acknowledgment mode over the bearer of the D2N link, to be switched to the D2D link, to discard the service data in the un-acknowledgment mode, or to continue with transmission of the service data in the un-acknowledgment mode over the bearer of the D2N link, to be switched to the D2D link; and for service data in the acknowledgment mode over the bearer of the D2N link, to be switched to the D2D link, to continue with transmission of the service data in the acknowledgment mode over the bearer of the D2N link, to be switched to the D2D link.

Further to any one of the embodiments above, preferably the access network device further includes the processor is further configured:

After the radio frequency module receives the response message of completed switching by the first user equipment, and the response message of completed switching by the second user equipment, to modify the D2N link configuration information of the D2N link to thereby save a resource occupied by the D2N link; or to determine the bearer of the D2N link, over which no service data need to be transmitted, and to remove the determined D2N link bearer over which no service data need to be transmitted.

Reference can be made to the description above of the embodiments of the access network device for particular implementations thereof, so a repeated description thereof will be omitted here.

Based upon the same inventive idea as the method, an embodiment of the invention further provides another access network device including a processor and a radio frequency module, where:

The processor is configured to judge whether a core network side link needs to be established for communication between a first user equipment and a second user equipment upon determining that D2D link communication needs to be established between the first user equipment and the second user equipment; and if so, to send a service request for communication between the first user equipment and the second user equipment to a core network device through the radio frequency module so that the core network device establishes a core network side link for the service request, and to send D2D link configuration information and a D2D link establishing instruction to the first user equipment and/or the second user equipment through the radio frequency module to instruct a D2D link for communication between the first user equipment and the second user equipment to be established according to the D2D link configuration information, after the radio frequency module receives an air interface link establishing instruction sent by the core network device; otherwise, to send D2D link configuration information and a D2D link establishing instruction to the first user equipment and/or the second user equipment through the radio frequency module to instruct a D2D link for communication between the first user equipment and the second user equipment to be established according to the D2D link configuration information.

Preferably the access network device further includes a memory configured to store a bearer mapping relationship between D2D links and D2N links between the first user equipment and the second user equipment and/or GTP information of the bearers after the radio frequency module receives the air interface link establishing instruction sent by the core network device.

Preferably the processor is configured:

To judge whether switching from the D2D link to a D2N link needs to be supported, and if so, to determine that a core network side link needs to be established for communication between the first user equipment and the second user equipment; otherwise, to determine that no core network side link needs to be established for communication between the first user equipment and the second user equipment.

Preferably the D2D link configuration information includes at least one of:

Identifier information of the second user equipment or the first user equipment, and D2D link bearer information; and The D2D link bearer information indicates at least one D2D link bearer, where each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

Reference can be made to the description above of the embodiments of the access network device for particular implementations thereof, so a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for switching communication, the method comprising:
   determining, by an access network device, that communication between a first user equipment and a second user equipment needs to be switched from a Device to Network (D2N) link to a Device to Device (D2D) link;
   sending, by the access network device, a switching command to the first user equipment and the second user equipment to instruct communication between the first user equipment and the second user equipment to be switched at an air interface side from the D2N link to the D2D link;
   receiving, by the access network device, a response message of completed switching by the first user equipment, and a response message of completed switching by the second user equipment; and
   storing, by the access network device, bearer information of a bearer of the D2N link, to be switched to the D2D link, or sending a bearer maintenance request to a core network node to request the core network node for maintaining a core network side link corresponding to the bearer to be switched to the D2D link;
   wherein storing, by the access network device, the bearer information of the bearer of the D2N link, to be switched to the D2D link, or sending the bearer maintenance request to the core network node comprises:
   after switching is completed, if there are still service data being transmitted over the bearer to be switched to the D2D link, then storing, by the access network device, the bearer information of the bearer of the D2N link, to be switched to the D2D link, so that the access network device switches communication between the first user equipment and the second user equipment from the D2D link to the D2N link according to the stored bearer information;
   after switching is completed, if there are no service data being transmitted over the bearer to be switched to the D2D link, then sending, by the access network device, the bearer maintenance request to the core network node to request the core network node for maintaining the core network side link corresponding to the bearer to be switched to the D2D link.

2. The method according to claim 1, wherein the bearer information of the bearer of the D2N link, to be switched to the D2D link includes:
   a bearer mapping relationship between the bearer to be switched to the D2D link, and a data stream, in the D2D link, and/or General packet radio service Tunnel Protocol (GTP) information of the bearer to be switched to the D2D link.

3. The method according to claim 1, wherein the switching command further includes Internet Protocol (IP) 5-tuple information and/or a mapping relationship between IP 5-tuples and D2D bearers so that the first user equipment and the second user equipment switch service data satisfying the IP 5-tuple information onto the D2D link.

4. The method according to claim 1, wherein the switching command includes D2D link configuration information, and a D2D link establishing instruction to instruct to establish the D2D link for communication between the first user equipment and the second user equipment according to the D2D link configuration information;
   the D2D link configuration information comprises D2D link bearer information; and
   the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

5. The method according to claim 4, wherein after the response message of completed switching by the first user equipment, and the response message of completed switching by the second user equipment are received, the method further comprises:
   for service data in an un-acknowledgment mode over the bearer of the D2N link, to be switched to the D2D link, discarding, by the access network device, the service data in the un-acknowledgment mode, or continuing with transmission of the service data in the un-acknowledgment mode over the bearer of the D2N link, to be switched to the D2D link; and
   for service data in an acknowledgment mode over the bearer of the D2N link, to be switched to the D2D link, continuing, by the access network device, with transmission of the service data in the acknowledgment mode over the bearer of the D2N link, to be switched to the D2D link.

6. The method according to claim 4, wherein after the response message of completed switching by the first user equipment, and the response message of completed switching by the second user equipment are received, the method further comprises:
   modifying, by the access network device, D2N link configuration information of the D2N link to save a resource occupied by the D2N link; or
   determining, by the access network device, the bearer of the D2N link, over which no service data need to be transmitted, and removing the determined D2N link bearer over which no service data need to be transmitted.

7. A method for establishing communication, the method comprising:
   judging, by an access network device, whether a core network side link needs to be established for communication between a first user equipment and a second user equipment upon determining that D2D link communication needs to be established between the first user equipment and the second user equipment;
   if the core network side link needs to be established for communication between the first user equipment and the second user equipment, then sending, by the access network device, a service request for communication between the first user equipment and the second user equipment to a core network device so that the core network device establishes a core network side link for the service request; and sending D2D link configuration information and a D2D link establishing instruction to the first user equipment and/or the second user equipment to instruct a D2D link for communication between the first user equipment and the second user equipment to be established according to the D2D link configuration information, upon reception of an air interface link establishing instruction sent by the core network device;
   if no core network side link needs to be established for communication between the first user equipment and the second user equipment, then sending, by the access network device, D2D link configuration information and a D2D link establishing instruction to the first user equipment and/or the second user equipment to instruct a D2D link for communication between the first user equipment and the second user equipment to be established according to the D2D link configuration information.

8. The method according to claim 7, wherein judging whether a core network side link needs to be established for communication between the first user equipment and the second user equipment comprises:
   judging whether switching from the D2D link to a D2N link needs to be supported, and if so, then determining that a core network side link needs to be established for communication between the first user equipment and the second user equipment; otherwise, determining that no core network side link needs to be established for communication between the first user equipment and the second user equipment.

9. The method according to claim 7, wherein the D2D link configuration information comprises at least one of:
   identifier information of the second user equipment or the first user equipment, and D2D link bearer information; and
   the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

10. An access network device comprising a processor and a radio frequency module, wherein:
    the processor is configured to determine that communication between a first user equipment and a second user equipment needs to be switched from a D2N link to a D2D link;
    the radio frequency module is configured to send a switching command to the first user equipment and the second user equipment to instruct communication between the first user equipment and the second user equipment to be switched at an air interface side from the D2N link to the D2D link; and to receive a response message of completed switching by the first user equipment, and a response message of completed switching by the second user equipment; and the processor is further configured to store bearer information of a bearer of the D2N link, to be switched to the D2D link, or to send a bearer maintenance request to a core network node to request the core network node for maintaining a core network side link corresponding to the bearer to be switched to the D2D link;

wherein the processor is configured:

after switching is completed, if there are still service data being transmitted over the bearer to be switched to the D2D link, to store the bearer information of the bearer of the D2N link, to be switched to the D2D link, so that the access network device switches communication between the first user equipment and the second user equipment from the D2D link to the D2N link according to the stored bearer information; and after switching is completed, if there are no service data being transmitted over the bearer to be switched to the D2D link, to send the bearer maintenance request to the core network node to request the core network node for maintaining the core network side link corresponding to the bearer to be switched to the D2D link.

11. The access network device according to claim 10, wherein the bearer information of the bearer of the D2N link, to be switched to the D2D link comprises:

a bearer mapping relationship between the bearer to be switched to the D2D link, and a data stream, in the D2D link, and/or General packet radio service Tunnel Protocol (GTP) information of the bearer to be switched to the D2D link.

12. The access network device according to claim 10, wherein the switching command further comprises Internet Protocol (IP) 5-tuple information and/or a mapping relationship between IP 5-tuples and D2D bearers so that the first user equipment and the second user equipment switch service data satisfying the IP 5-tuple information onto the D2D link.

13. The access network device according to claim 10, wherein the switching command comprises D2D link configuration information and a D2D link establishing instruction, wherein the D2D link establishing instruction is configured to instruct to establish the D2D link for communication between the first user equipment and the second user equipment according to the D2D link configuration information;

the D2D link configuration information comprises D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

14. The access network device according to claim 13, wherein the processor is further configured:

after the radio frequency module receives the response message of completed switching by the first user equipment, and the response message of completed switching by the second user equipment, for service data in an un-acknowledgment mode over the bearer of the D2N link, to be switched to the D2D link, to discard the service data in the un-acknowledgment mode, or to continue with transmission of the service data in the un-acknowledgment mode over the bearer of the D2N link, to be switched to the D2D link; and for service data in the acknowledgment mode over the bearer of the D2N link, to be switched to the D2D link, to continue with transmission of the service data in an acknowledgment mode over the bearer of the D2N link, to be switched to the D2D link.

15. The access network device according to claim 13, wherein the access network device further comprises the processor is further configured:

after the radio frequency module receives the response message of completed switching by the first user equipment, and the response message of completed switching by the second user equipment, to modify D2N link configuration information of the D2N link to save a resource occupied by the D2N link; or to determine the bearer of the D2N link, over which no service data need to be transmitted, and to remove the determined D2N link bearer over which no service data need to be transmitted.

16. An access network device, comprising a processor and a radio frequency module, wherein:

the processor is configured to judge whether a core network side link needs to be established for communication between a first user equipment and a second user equipment upon determining that D2D link communication needs to be established between the first user equipment and the second user equipment; and if so, to send a service request for communication between the first user equipment and the second user equipment to a core network device through the radio frequency module so that the core network device establishes a core network side link for the service request, and to send D2D link configuration information and a D2D link establishing instruction to the first user equipment and/or the second user equipment through the radio frequency module to instruct a D2D link for communication between the first user equipment and the second user equipment to be established according to the D2D link configuration information, after the radio frequency module receives an air interface link establishing instruction sent by the core network device; otherwise, to send D2D link configuration information and a D2D link establishing instruction to the first user equipment and/or the second user equipment through the radio frequency module to instruct a D2D link for communication between the first user equipment and the second user equipment to be established according to the D2D link configuration information.

17. The access network device according to claim 16, wherein the processor is configured:

to judge whether switching from the D2D link to a D2N link needs to be supported, and if so, to determine that a core network side link needs to be established for communication between the first user equipment and the second user equipment; otherwise, to determine that no core network side link needs to be established for communication between the first user equipment and the second user equipment.

18. The access network device according to claim 16, wherein the D2D link configuration information comprises at least one of:

identifier information of the second user equipment or the first user equipment, and D2D link bearer information; and the D2D link bearer information indicates at least one D2D link bearer, wherein each D2D link bearer corresponds to at least one bearer of the core network side link, and the bearers of the core network side link, corresponding to the respective D2D link bearers are different from each other; or the D2D link bearer information indicates D2D link bearers corresponding to different service characteristics.

* * * * *